United States Patent [19]

Wagensommer et al.

[11] 4,146,692

[45] Mar. 27, 1979

[54] PROCESS AND PRODUCT FOR MANUFACTURE OF ELASTOMERIC CO- OR TERPOLYMERS

[75] Inventors: Joseph Wagensommer, Westfield; Pacifico V. Manalastas, Jersey City, both of N.J.

[73] Assignee: Exxon Research & Engineering Co., Florham Park, N.J.

[21] Appl. No.: 827,770

[22] Filed: Aug. 25, 1977

[51] Int. Cl.$^2$ .................... C08F 4/52; C08F 210/12; C08F 232/06; C08F 236/08

[52] U.S. Cl. ........................... 526/65; 526/73; 526/309; 526/339

[58] Field of Search .............. 526/65, 73, 339, 309

[56] References Cited

U.S. PATENT DOCUMENTS

| | | | |
|---|---|---|---|
| 2,643,993 | 6/1953 | Tegge | 526/65 |
| 2,974,126 | 3/1961 | Kelley | 526/65 |
| 3,071,567 | 1/1963 | Kelley | 526/65 |
| 3,349,065 | 10/1967 | Kennedy | 526/339 |
| 4,016,342 | 4/1977 | Wagensommer | 526/65 |
| 4,029,866 | 6/1977 | Kennedy | 526/339 |

*Primary Examiner*—Alan Holler
*Attorney, Agent, or Firm*—R. E. Nanfeldt

[57] ABSTRACT

In a process for producing substantially gel free elastomers of isobutylene and a conjugated diene selected from the group consisting of cyclopentadiene, methylcyclopentadiene, isoprene or piperylene and mixtures thereof, improved products, higher catalyst efficiency, high cement concentrations and improved monomer conversions are obtained by the use of staged, or multiple reactors whereby the monomers and/or catalyst feeds may be divided among the reaction zones. The process provides elastomers which are substantially gel free having controlled molecular weight distribution (polydispersity) and high molecular weights at about 8 to about 45 mole % unsaturation.

11 Claims, 1 Drawing Figure

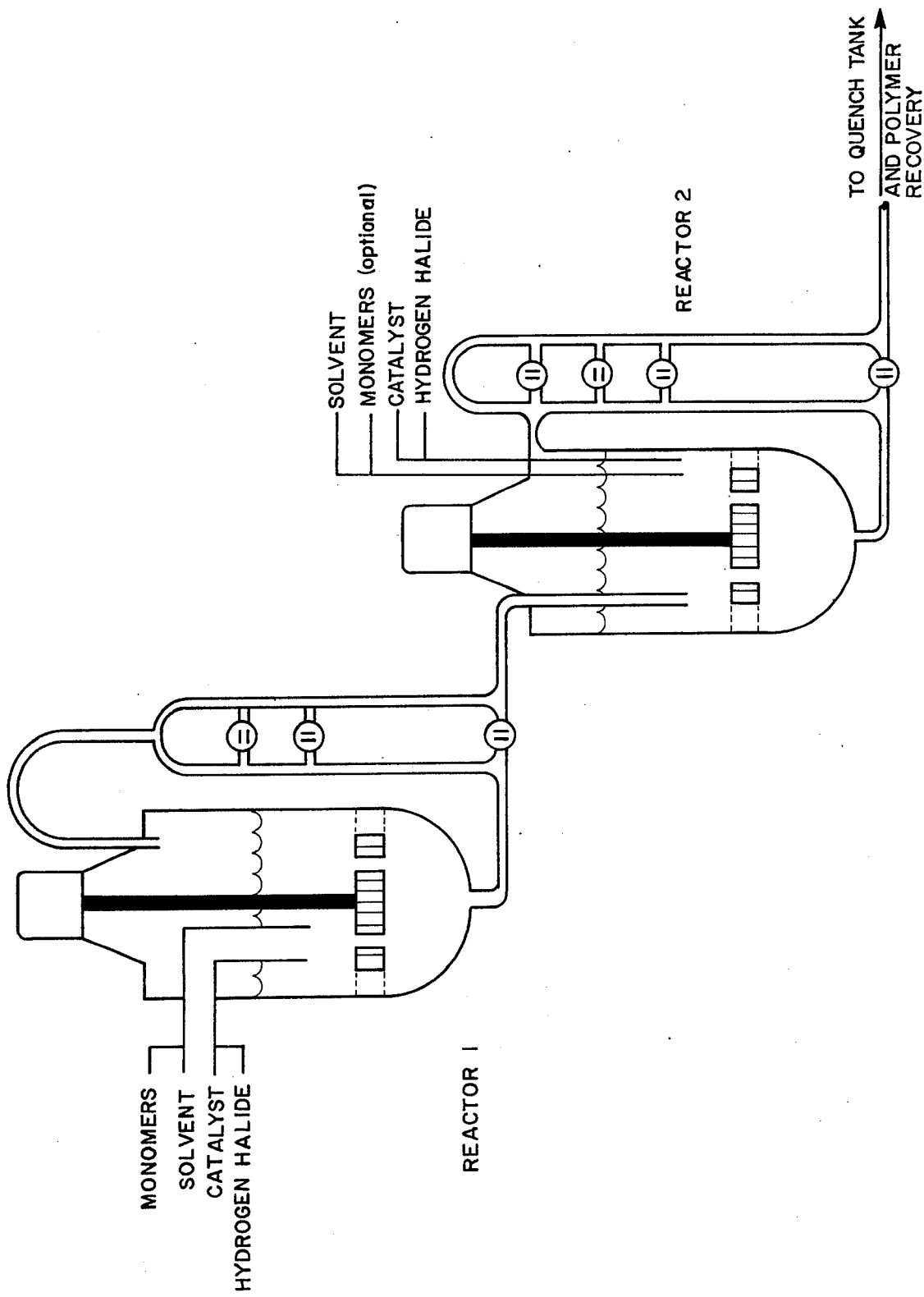

PROCESS AND PRODUCT FOR MANUFACTURE OF ELASTOMERIC CO- OR TERPOLYMERS

BACKGROUND OF THE INVENTION

1. Field of the Invention

In a process for producing substantially gel free elastomers of isobutylene and a conjugated diene selected from the group consisting of cyclopentadiene, methylcyclopentadiene, isoprene or piperylene and mixtures thereof, improved products, higher catalyst efficiency, high cement concentrations and improved monomer conversions are obtained by the use of staged, or multiple reactors whereby the monomers and/or catalyst feeds may be divided among the reaction zones. The process provides elastomers which are substantially gel free having controlled molecular weight distribution (polydispersity) and high molecular weights at about 8 to about 45 mole % unsaturation.

2. Description of the Prior Art

U.S. Pat. No. 4,016,342 to J. Wagensommer describes a method for producing elastomers from the copolymerization of ethylene and $C_3$ to $C_{10}$ alpha olefins. A number of major critical differences exist between the present instant application and U.S. Pat. No. 4,016,342. The cationic catalyst system of the instant invention which is an alkyl-aluminum dihalide and a hydrogen halide differs substantially from the Ziegler-Natta type catalyst of U.S. Pat. No. 4,016,342 which are incapable of copolymerizing isobutylene and a conjugated diene to produce a polymer having both high molecular weight and a high % unsaturation. Additionally in U.S. Pat. No. 4,016,342 a different cocatalyst is added to the second reactor whereas in the instant application the same co-initiator (HCl) is added to both reactors. In U.S. Pat. No. 4,016,342 the reaction feed has at least about 80 wt. % solvent whereas in the instant application there is only 20 vol. % of solvent. The ratio of monomer to solvent in 4,016,342 is about 0.1 to about 0.3 whereas in the instant application it is about 2.0 to about 5.0. The operating temperatures in U.S. Pat. No. 4,016,342 is about $-50°$ to $+150°$ C. whereas in the instant invention it is about $-50°$ C. to about $-100°$ C. Additionally, in U.S. Pat. No. 4,016,342 the temperature is the same in both reactors whereas in the instant invention the temperature is higher in the second than the first reactor. Additional differences between U.S. Pat. No. 4,016,342 and the instant application reside in the catalyst to cocatalyst ratios and catalyst to monomer ratios.

The catalyst systems of the improved process of the instant invention differ markedly from those of the prior art. The halogens, halogen acids, interhalogen compounds and organic halogen compounds are not used as cocatalysts but instead are prereacted with the organic aluminum compound to generate novel catalyst species which are hydrocarbon soluble and can be utilized in cationic polymerization systems. These catalysts are generally more reactive and give higher molecular weights than the corresponding organoaluminum compounds from which they are derived. Furthermore, the prereacted catalysts of the instant invention give products superior to the polymerization products obtained using halogens, halogen acids, interhalogen compounds or organic halides as cocatalysts.

Numerous prior art examples using cocatalysts are extant. These are clearly distinguishable from the catalysts of the instant invention. The halides, etc. of the prior art are used either in situ as cocatalysts or as complexing agents.

U.S. Pat. No. 2,220,930 teaches the manufacture of polymers using catalysts such as dialkylaluminum halides or alkylaluminum halides, generally represented as $MX_mR_n$ where M represents aluminum, gallium, or boron, X represents halogen, R represents a monovalent hydrocarbon radical, m or n represent integers 1 to 2 inclusive, and $m + n = 3$. The catalyst can also be a complex of the above compounds with inorganic halides (e.g. NaCl) or with ammonia or amines. In practice, U.S. Pat. No. 2,220,930 utilized either dialkylaluminum halides or alkylaluminum dihalides alone or in a mixture of equal parts which is commonly known as the sesquihalide. The polymers of isobutylenes obtained were low molecular weight resins.

U.S. Pat. No. 2,387,517 relates to the manufacture of polymers prepared by the copolymerization of various unsaturated compounds in the presence of catalysts of the type $MX_mR_n$ where M represents aluminum, gallium or boron, X represents a halogen, R represents a monovalent hydrocarbon radical, m or n represent integers from 1 to 2 inclusive and $m + n = 3$. The invention is particularly directed to the formation of curable rubber-like products by the copolymerization of isobutylene with low molecular weight diolefins, especially those having 4 to 6 carbon atoms. The products are described as ranging in molecular weight from 1000 to 3000 up to 300,000 or higher. However, the type of molecular weight is not indicated, (i.e. but most likely is viscosity average, weight average), nor is an actual polymer approaching 300,000 molecular weight prepared. The composition used as catalysts in the above two related cases are not prepared by prereacting an alkyl aluminum halide with halogens, halogen acid or interhalogen compounds of the instant invention and do not suggest the superiority which the instant compositions demonstrate as catalysts.

U.S. Pat. No. 2,388,428 relates to an improved method for affecting organic chemical reactions by generating Friedel-Crafts metal halide catalysts in situ. It teaches dissolving an organoaluminum compound in a hydrocarbon reactant being charged to the process and contacting said solution with an excess of hydrogen halide in a reaction zone under hydrocarbon conversion conditions whereby an aluminum halide catalyst is generated in situ and the conversion reaction is effected. The hydrogen halide is added in excess (in an excess over the amount required to completely convert the organoaluminum compound to the aluminum halide so as to generate aluminum halide (e.g. $AlCl_3$) in situ). Such generation of aluminum chloride is described as being subject to greater control and of greater precision than prior art methods of dissolving or suspending the aluminum halide in the reaction mixture. Particular note should be taken of the fact that the catalyst components are not prereacted and then added to the reaction zone, but are reached in situ. Furthermore, the stoichiometry is quite different from the catalysts of the instant invention. The molar ratio of catalyst to monomer is greater than 0.026 and the cocatalysts to catalyst ratio is greater than 4.4. The use of the catalyst of U.S. Pat. No. 2,388,428 for the purposes of polymerization is not taught as the examples are directed solely to isomerization and alkylation at temperatures of 10° to 70° C.

U.S. Pat. No. 3,349,065 teaches an improved catalyst system for producing high molecular weight butyl rubbers, having less than 5.5% mole unsaturation by a slurry process which are highly gelled (4.7 to 70%). The catalyst system comprises a dialkylaluminum halide together with a small but critical amount of an anhydrous hydrogen halide as a promoter (cocatalyst). The amount of anhydrous hydrogen halides used ranges from 0.01 mole to 0.05 mole promoter per mole of dialkylaluminum monohalide. The maximum desirable ratio is 0.05 mole promoter per mole of catalyst. Furthermore, the hydrogen halide is added to a solution containing both the dialkylaluminum chloride and monomer and is not prereacted with said organoaluminum compound as in the method of the instant invention. This patent does not teach, imply or infer the use of a solution process for the formation of gel free elastomers. The catalyst/monomer ratio is $\geq 0.0057$.

U.S. Pat. No. 3,562,804 also describes the use of an organoaluminum compound in conjunction with hydrogen chloride or a $C_3$-$C_7$ organic halide compound as promoter to produce low viscosity mastic compositions by a slurry process. Here again, the catalyst and promoter were combined in the presence of monomer and all examples teach the separate addition of catalyst and promoter to the polymerization (monomer) mixture. The catalyst to monomer ratio is at least about 0.001. The catalyst/cocatalyst ratio is $\geq 3.0$.

U.S. Pat. No. 3,850,897 teaches a procedure of the production of polymers and copolymers of isobutylene. The catalyst disclosed is of the general formula RAl(YR')X where Y is an oxygen or sulfur atom together with a wide variety of promoters. The aluminum compounds disclosed in this patent are different from those of the instant invention. Furthermore, the patent in question teaches the necessity of combining catalyst and cocatalyst in the presence of monomers. Stepwise addition of catalyst and cocatalyst to the polymerization medium is demonstrated in the examples. The catalyst to monomer ratio is at least about 0.0038.

U.S. Pat. No. 3,835,079 teaches hot melt compositions comprising styrene, isobutylene copolymer wax and a primary resin. The catalysts employed a system utilizing a primary component alkylaluminum dihalide with a promoter (cocatalyst) such as hydrogen halide. The maximum cocatalyst is 30 mole percent of the primary catalyst. A more limited range, 2.5 to 15 is preferred or 5 to 10% with cocatalysts such as water. The range of compositions is clearly outside that of the instant invention. Furthermore, the promoters are stated to be cocatalysts in this patent while they are consumed in a prior reaction in the instant invention and are not available to serve as cocatalysts.

U.S. Pat. No. 3,560,458 teaches a polymerization process utilizing a catalyst of the type Al(M)$_2$R where M is an alkyl group and R is alkyl, hydrogen or halogen. It is obvious that the catalyst intended for use is the alkyl or the monohalide. Experimental procedure reveals a stepwise addition of cocatalyst promoters to a solution containing catalyst in the cationically polymerizable monomer. The molar ratio catalyst to monomer is at least about 0.007.

British Pat. No. 1,362,295 teaches a catalyst suitable for use in the polymerization of unsaturated compounds and a process for employing such a catalyst. The catalyst used is a two-component substance, the primary component being $R_2AlX$ wherein R is a hydrocarbon or hydrogen radical, X can be hydrocarbon, hydrogen or halogen. The secondary component is represented as YZ wherein each of Y and Z are the same or different halogen. The component can be present in a ratio of primary to secondary of from 0.1:1 to 1000:1.

Other patents which are non-applicable to the instant invention are: U.S. Pat. Nos. 3,757,000 and 3,560,458; British Pat. Nos. 1,309,131 and 1,157,043; and U.S. Pat. Applications Nos. 635,695 and 737,917.

All examples contain active cocatalysts, and no criticality for prereaction of components is taught. Furthermore, the ratios of materials involved are such as to not practice the invention of the instant specification and no showing is made of there being a ratio demonstrating superior performance.

SUMMARY OF THE INVENTION

It has now been discovered that the molecular weight parameters of a co- or terpolymer of isobutylene and a conjugated diene may be controlled within a selected range, in a continuous process, using a plurality of reactor zones joined in series. This is accomplished by feeding to the first reactor: solvent, monomers, alkylaluminum dihalide catalyst, and HCl coinitiator at a temperature of from about $-40°$ C. to about $-100°$ C. and at a pressure ranging from 0 to 500 psig; discharging the polymer cement from the first reactor and feeding same to the second reactor, along with additional monomer and coinitiator. The second reactor is maintained at essentially the same or preferably higher temperature than the first reactor. The reactor contents are maintained at a relatively constant temperature by use of chilled diluent used in the reactor feed.

Accordingly, it is an object of the instant invention to provide an improved solution process for the formation of high quality elastomers of co- and terpolymers of isobutylene and one or more dienes having an Mn of less than about 500,000, a mole % unsaturation of about 8 to about 45, and a polydispersity of about 3 to about 30. A further object of the instant invention is to provide an improved process having improved catalyst efficiency, higher monomer conversion, and higher cement concentration which was previously impossible with other processes.

BRIEF DESCRIPTION OF THE DRAWING

The FIGURE illustrates a schematic drawing of the improved process.

DESCRIPTION OF THE PREFERRED EMBODIMENTS

Referring to the drawing of the invention, monomers, solvents, catalyst and coinitiator are fed continuously to the stirred Reactor 1. Without quenching or otherwise deactivating the catalyst components, except through attrition within the reactor, the polymer cement is fed directly from the Reactor 1 to Reactor 2. There is fed continuously to Reactor 2 additional monomer, coinitiator and solvent. The monomers are further polymerized in Reactor 2.

The temperature in the reactors is maintained relatively constant by use of heat exchangers or other conventional means. Preferably, the temperature is maintained by use of chilled diluent addition to the reaction zone.

Following polymerization in Reactor 2, the polymer cement is discharged and fed to catalyst deactivators where the cement is "quenched", polymer recovered and fed to the finishing operation. Conventional procedures and inactivating media may be used, following the second reactor, to inactivate the combined catalyst components and recover unreacted monomers, solvent and finished polymer from the reaction mixture. All of the monomers, solvents and catalyst components are rigorously dried and freed from dissolved moisture or other constituents which are known to be harmful to the activity of the catalyst system. Feed tanks, lines and reactors may be protected by blanketing with a dry, inert gas such as nitrogen.

In forming the substantially gel free co- and terpolymers (elastomers) of the instant invention, one group of cationically polymerizable monomers suitable for use with the novel process of the instant invention are cationically polymerizable unsaturated compounds, especially unsaturated hydrocarbons. Particularly valuable polymers can be prepared from isoolefins, of from 4 to 20 carbons, multiolefins (conjugated diene) of from 5 to 20 carbons, or mixtures thereof to produce homopolymers and copolymers. Examples of such unsaturated hydrocarbons include but are not restricted to isobutylene, 2-methylbutene, 3-methylbutene-1, 4-methylpentene-1, and β-pinene. Multiolefins include but are not limited to butadiene, isoprene, piperylene, 2,3-dimethylbutadiene, cyclopentadiene, methylcyclopentadiene, 1,3-cyclohexadiene, dimethylfulvene and divinylbenzene.

The resultant number average molecular weight Mn as measured by membrane osmometry of the formed co- or terpolymers (elastomers) of the instant invention are about 30,000 to about 500,000, more preferably about 40,000 to about 400,000, and most preferably about 50,000 to about 300,000.

The resultant mole % unsaturation (i.e. — the amount of incorporation of conjugated diene into the co- or terpolymer) in the co- or terpolymer is about 8 to about 45 mole %, more preferably about 10 to about 40, and most preferably about 12 to about 35.

The polydispersity (Q) value of the resultant co- or terpolymers is about 3 to about 30, more preferably about 5 to about 25, and most preferably about 7 to about 15. Depending on whether a copolymer elastomer or terpolymer elastomer is to be produced, the monomers can be fed to the first and subsequent stages in a preferred mole ratio. Monomer feeds to all stages can be set for a typical terpolymer for example: isobutylene, 200 to 800 pts. by weight per 100 pts. by weight of solvent, preferably 400 to 750; isoprene, 10 to 100 pts. by weight per 100 pts. by weight of solvent, preferably 15 to 50 pts. by weight per 100 pts. by weight of solvent; and cyclopentadiene, 0.1 to 80 pts. by weight per 100 pts. by weight of solvent, preferably 0.5 to 50 pts. by weight per 100 pts. by weight of solvent.

The co- and terpolymers (elastomers) of this invention are prepared by reacting the monomers dissolved in a solvent, preferably a hydrocarbon solvent, more preferably a paraffinic hydrocarbon solvent, most preferably a cyclo paraffinic solvent from $C_1$ to $C_{10}$ carbon atoms, wherein the catalyst (dissolved in a solvent for the polymerization) is the reaction product of an aluminum containing compound and a halogen containing compound.

It is a vital requirement of this invention that said aluminum containing compound be reacted with said halogen, containing compound prior to introducing the resultant catalyst solution into the first reactor, wherein polymerization of the monomers in cosolvent occurs within the first reactor.

The cosolvents of the instant invention are selected from the group consisting of cyclic, branched or normal paraffinic hydrocarbons and mixtures thereof. A preferred cosolvent system is a blend of 75 wt. % of cyclohexane and 25% weight % hexane. The weight ratio of isobutylene to cosolvent is critically selected at about 1 to about 10, more preferably at about 1.5 to about 6 and most preferably at about 2 to about 5.

The catalyst solution of the improved process is prepared by prereacting an aluminum containing compound with a halogen containing compound prior to injection into the reactor.

The aluminum containing material used in the catalyst preparation of the improved process of the instant invention is an alkylaluminum halide ($R_mAlX_{3-m}$), wherein R is an alkyl radical (straight or branched) having about 1 to about 7 carbon atoms, and X is selected from the group consisting of Cl, Br or I and mixtures thereof, and m is 1, 2 or 3. A preferred primary catalyst is ethyl aluminum dichloride and a most preferred primary catalyst is methyl aluminum dichloride.

The halogen containing compound useful in the practice of this invention are selected from the group consisting of a halogen, halogen acid, mixed halogen or organohalide wherein the halogen is selected from the group consisting of chlorine and bromine and the organo group is an alkyl group of straight or branched chain structure of from 2 to 20 carbon atoms, an allylic group of 3 to 20 carbon atoms, or a benzylic group of 7-20 carbon atoms, preferably an alkyl group having 2-6 carbons, an allylic group having 3-6 carbons or a benzylic group having 7 to 10 carbons. The most preferred coinitiator is HCl.

The preparation of the catalyst from the components (aluminum-containing compound and halogen containing-compound) is preferably carried out in a solvent, more preferably in a hydrocarbon solvent, most preferably in a paraffinic hydrocarbon liquid or mixtures thereof, of from 1 to 10 carbons which may be normal, branched or cyclic in structure. The components are preferably diluted in an inert paraffinic solvent such as butane, isobutane, pentane, isopentane, hexane, isomeric hexanes, cyclohexane, methylcyclohexane or mixtures of paraffinic solvents are the solvents of choice for the polymerization so as to facilitate mixing and reaction.

The molar ratio of the $R_mAlX_{3-m}$ to monomer is about 0.0001 to about 0.001, more preferably about 0.0002 to about 0.0008, and most preferably about 0.0004 to about 0.0006. The molar ratio of halogen containing material to $R_mAlX_{3-m}$ is critically selected at about 0.014 to about 0.065, more preferably at about 0.025 to about 0.055 and most preferably about 0.030 to about 0.05. The formation of the catalyst is done prior to contact with the monomers and is preferably at least about 60 seconds, more preferably about 20, and most preferably about 5 thereby ensuring formation of the catalyst prior to contact with the monomers and this minimizing adverse side reactions of either the halogen containing material.

The catalysts of this invention are particularly valuable since they not only give extremely high catalyst efficiencies thereby giving high % conversion but they also produce higher molecular weight polymers, copolymers at warmer temperatures than conventional catalysts.

The reactive catalyst entity thus employed in the improved instant process, exhibits higher catalytic activity and efficacy than catalysts of the prior art and permits polymerization reactions to be run which yield higher molecular weight polymers and copolymers at higher temperature and/or the inclusion of a greater degree of unsaturation in a polymer of either high or low molecular weight at temperatures higher than previously possible.

The catalysts of this improved process offer further benefits in that they frequently give higher molecular weight polymers and copolymers than the generally available organoaluminum compounds from which they are conveniently and inexpensively prepared. The formation of polymers of higher molecular weights with the novel catalysts of this invention frequently permits operation at warmer polymerization temperatures (−50° to −100° C.) while yielding equivalently high molecular weight polymers. Since polymer molecular weights generally decrease with increasing temperature in prior art cationic polymerizations, the ability of the instant invention to yield high molecular weight polymers at higher temperature is a marked advance over the prior art. Since polymerizations are generally quite exothermic and frequently carried out at low temperatures, process limitations relating to solution viscosity, heat transfer rates, maximum solids contents and ultimately production capacity for a given size unit are encountered. Thus, it is beneficial and industrially quite valuable if the desired molecular weights can be attained at warmer polymerization temperatures. The present invention features these characteristics and advantages.

The operating temperatures for polymerization in the first reactor are about −60° to about −110° C., more preferably about −70° to about −100° C., and most preferably about −80° to −95° C. The operating temperatures for polymerization in the second reactor are about −40° to about −90° C., more preferably about −50° to about −85° C., and most preferably about −55° to about −80° C. Preferably, the operating temperature of the second reactor is at least 20° C. higher than the operating temperature of the first reactor. The pressure at which the polymerization is conducted will depend on the temperature of reaction and polymerization rate but in any case, the pressure is maintained at a sufficient level so as to be equal to the combined vapor pressure of the solvent and reaction components. For the most preferred temperature range, the pressure required to maintain the reactants in the liquid phase is in the order of about 0 to about 500 psig.

An alternative embodiment of reaction zones may be provided in order to accomplish the superior results achieved by using 2 reactors in series. Within a single reactor, a horizontal baffle may be inserted, dividing the reactor with two separate and distinct zones for polymerization.

In such an arrangement, separate feed inlets are provided to each reaction zone. The same sequence of adding solvent, monomers, catalyst and coinitiator is provided to each zone, as in the case of two separate reactors.

In both methods, there is provided the opportunity to manipulate addition of the various feed components. Depending on the particular co- or terpolymer composition desired, additional isobutylene or conjugated diene could be added to the second reactor or zone, singly or in a particular combination. Alternatively, all monomers added to Reactor 1 could also be added to Reactor 2.

Another variable could be in the use of a different catalyst solution or concentration in Reactor 2, from that used in Reactor 1. Interesting effects on molecular weight distribution have been discovered using this technique.

The general improved continuous process of the instant invention for the production of an elastomeric co- or terpolymer of an isoolefin and at least one conjugated diene includes connecting two stirred reaction zone in series. To the first reaction zone is added a first feed of the isoolefin and at least one conjugated diene, wherein the isoolefin and conjugated diene are dissolved in a cosolvent. A second feed of a catalyst dissolved in a solvent is added to the first reaction zone, wherein the catalyst is the reaction product of an aluminum containing compound $RAlX_2$ and a halogen containing compound, wherein X is selected from the group consisting of chlorine, bromine, or iodine. A portion of the isoolefin and at least one conjugated diene is polymerized in the first reaction zone at a temperature of about −60° to about −110° C. and a pressure of about 0 to about 500 psig to form a polymer cement which is subsequently discharged into the second reaction zone which is joined to the first reaction zone in series. A third feed of additional isoolefin and/or at least one conjugated diene dissolved in the cosolvent may be added to the second reaction zone. Additional coinitiator is added to the second reaction zone thereby permitting further polymerization of the isoolefin and at least one conjugated diene at a temperature of about −40 to about −90 and a pressure of about 0 to about 500 psig. Upon completion of the polymerization in the second reaction zone, the contents of the second reaction zone are discharged and the polymerization reaction of said discharged contents is terminated, collected and finished into the elastomeric co- or terpolymer.

Some examples which follow will illustrate some aspects of the utility of the new improved process. It is emphasized that these examples are illustrative and other applications will be obvious to those skilled in the art.

A series of copolymers were prepared according to this invention by the following procedure:

EXAMPLE 1

All feed streams were dried before they were injected into a well-stirred stainless steel reactor. The first stream consisted of 68.6 wt. % isobutylene, 8.6 wt. % cyclopentadiene (CPD) and 22.8 wt. % cosolvent (75 wt. % cyclohexane and 25 wt. % hexane). The second feed stream consisted of ethylaluminumdichloride (dissolved in cosolvent) and anhydrous hydrogen chloride.

The first feed stream was chilled to a temperature of −134° C. prior to its continuous introduction into the first reactor as depicted in FIG. 1. The second (catalyst) stream was injected into the reactor through a separated feed nozzle at ambient temperature. The contact time of the EADC and HCl was about 5 sec-s. The temperature of the first reactor and its contents was maintained constant at −102° C. by circulating refrigerant through the reactor jacket. The feed rates of the isobutylene, CPD and cosolvent were adjusted so that a 16-minute nominal residence time was provided in the first reactor.

Polymerization occurred only in the reactor. The reactor effluent was contacted with an isopropyl alcoholammonia quench stream to deactivate the catalyst. The process conditions were the following when the reactor achieved steady state:

TABLE 1

|  | Feeds, gram/hr |
|---|---|
| Isobutylene | 12,000 |
| CPD | 1,500 |
| Cosolvent | 4,000 |
| EADC | 17.0 |
| HCl | 0.45 |

At steady state conditions the reactor effluent contained about 9.9 wt. % copolymer, and about 9.5% of isobutylene and 40% of CPD introduced into the reactor was converted to polymer. The catalyst efficiency was 100.

The reactor effluent was then stabilized with IRGANOX 1010. The stabilized polymer solution was then steam stripped, and the precipitated polymer crumb was dried on a hot mill.

The obtained copolymer had the following properties:

TABLE 2

| CPD Content by R.I. | 31 mole % |
|---|---|
| Mooney Viscosity at 126.7° C. | 50 |

EXAMPLE II

Using the same process conditions as in Example I, a second reactor was added in series after the first one as depicted in FIG. 1. This reactor was also a stirred reactor, but smaller than the first one and without any cooling facilities. This reactor operated at −75° C. and the only feed to it was 0.16 gram/hr anhydrous hydrogen chloride. The nominal residence time in the second reactor was 4 minutes. The reactor effluent from the second reactor was contacted with an isopropyl alcohol-ammonia quench stream to deactivate the catalyst.

At steady state conditions the second reactor effluent contained about 20.1 wt. % copolymer and about 20.4% of isobutylene and 72% of CPD introduced into the reactor was converted to copolymer. The catalyst efficiency was 207.

The reactor effluent was then stabilized with IRGANOX 1010. The stabilized polymer solution was then steam stripped, and the precipitated copolymer crumb was dried on a hot mill. The obtained copolymer had the following properties:

TABLE 3

| CPD Content by R.I. | 27 mole % |
|---|---|
| Mooney viscosity at 126.7° C | 11 |

Results in Example II indicate that the solid content (cement concentration), the monomer conversions, and the catalyst efficiency were more than doubled by the use of series reactors.

EXAMPLE III

With the same method as described in Example I, but using methylaluminumdichloride (MADC) instead of ethylaluminumdichloride as a catalyst. The process conditions for the single reactor run, and the results of the tests are shown in Tables 4 and 5 below.

TABLE 4

| 1st Reactor N. Res. Time | Feed Temp. ° C. | 1st Reactor Temp. ° C. | Feeds, grams/hr | | | | |
|---|---|---|---|---|---|---|---|
| | | | ISO-C$_4$= | CPD | Cosolv. | MADC | HCl |
| 16 minutes | −136 | −93 | 12,000 | 1,450 | 3,500 | 21.0 | .50 |

TABLE 5

| Cement Conc. wt % | Catalyst Efficiency | Conversion % | | Polymer Comp. CPD M% | $M_L$ at 126.7° C | Mn |
|---|---|---|---|---|---|---|
| | | ISO-C$_4$= | CPD | | | |
| 14 | 116 | 13.4 | 57 | 30 | 40 | — |

EXAMPLE IV

Using the same process conditions as in Example III, a second reactor was added in series after the first one. The nominal residence time in the second reactor was 4 minutes. This reactor operated at −52° C., and beside the 1st reactor effluent, a cosolvent feed of 317 grams/hr and an anhydrous hydrogen chloride feed of 0.50 grams/hr was added to the second reactor. The results of this series reactor test are shown in Table 6 below.

TABLE 6

| Cement Conc. Wt. % | Catalyst Efficiency | Conversion % | | Polymer Composition CP | | $M_L$ at $\overline{M}n$ |
|---|---|---|---|---|---|---|
| | | ISO-C$_4$= | CPD | Mole % | 126.7° C. | |
| 18.8 | 152 | 17.6 | 74 | 30 | 24 | 44,000 |

Results in Example IV show that a significant increase can be achieved in reactor cement concentration, catalyst efficiency and in monomer conversion, by series reactor operation.

Various terms as set forth in the specification and claims are hereby defined as:

1. Rate — The rate of polymerization in grams per hour.
2. Efficiency — The catalyst efficiency was determined in terms of grams of polymer produced per grams of aluminum alkyl dihalide fed.
3. % Conversion — The percent of isobutylene and separately the percent of diene injected into the reaction vessel, which was converted into polymer product, was measured.
4. % Unsaturation-Diene Content — The mole % of diene in the polymer was measured by refractive index.
5. Inherent Viscosity — The inherent viscosity of the polymer product was determined in decalin at 135° C. (AMI-148-023).
6. $M_L$ — The Mooney viscosity at 126.7° C. was determined using a large #1 rotor for 8 minutes.
7. $M_n$ — The number average molecular weight was determined by membrane osmometry.
8. Gel Content — The percent of polymer insoluble in toluene at 100° C. One gram of polymer is disclosed in 100 ml of toluene at 100° C. and filtered through a 200 mesh screen. The amount of insoluble polymer retained on the screen is dried and weighed and converted into % insoluble polymer. By substantially gel free is meant less than about 2 weight % of polymer insolubles.

Since many modifications and variations of this invention may be made without departing from the spirit or scope of the invention, it is not intended to limit the spirit or scope thereof to the specific examples thereof.

What is claimed is:

1. A continuous process for the production of an elastomeric co- or terpolymer of an isoolefin and at least one conjugated diene, which comprises connecting a plurality of stirred reactor zones in series;
   (a) adding to said first reactor zone:
      1. A first feed of said isoolefin and at least one said conjugated diene, said isoolefin and said conjugated diene being dissolved in a cosolvent, said cosolvent being selected from the group consisting of cyclic, branched or normal paraffinic hydrocarbons and mixtures thereof, and
      2. a second feed of a catalyst dissolved in a hydrocarbon solvent having about 1 to about 10 carbon atoms, said catalyst being the reaction product of an aluminum containing compound ($R_mAlX_{3-m}$) and a halogen containing compound, wherein R is an alkyl radical having about 1 to about 7 carbon atoms and X is selected from the group consisting of chlorine, bromine and iodine and mixtures thereof and m is 1, 2 or 3, said halogen containing compound being selected from the group consisting of halogen acids, halogens, interhalogens and organo halides;
   (b) polymerizing a portion of said isoolefin and at least one said conjugated diene at a temperature in the range of about $-60°$ to about $-110°$ C., at a pressure of from about 0 to about 500 psig, to form a polymer cement;
   (c) passing said polymer cement from said first reaction zone to second reaction zone, connected in series with said first reaction zone;
   (d) adding to said second reaction zone:
      1. a third feed of additional said isoolefin and said conjugated diene dissolved in said cosolvent, and
      2. a fourth feed of additional said catalyst dissolved in said solvent;
   (e) further polymerizing said isoolefin and at least one said conjugated diene at a temperature in the range of about $-40°$ to about $-90°$ C., at a pressure of from about 0 to about 500 psig;
   (f) discharging the contents from said second reaction zone and terminating the polymerization reaction of said discharged contents; and
   (g) collecting the elastomeric co- or terpolymer.

2. The process of claim 1, wherein said isoolefin is isobutylene and said conjugated diene is selected from the group consisting of isoprene, cyclopentadiene, piperylene and methylcyclopentadiene and mixtures thereof.

3. The process of claim 1, wherein a molar ratio of said $R_mAlX_{3-m}$ to said halogen containing compound is about 0.014 to about 0.065.

4. The process of claim 3, wherein a molar ratio of said isobutylene to said cosolvent is about 4 to about 20.

5. The process of claim 4, wherein said cosolvent is a mixture of hexane and cyclohexane.

6. The process of claim 1, wherein said first reaction zone is a first reactor and said second reaction zone is a second reactor.

7. The process of claim 1, wherein said isoolefin is isobutylene and said conjugated diene is isoprene, said resultant copolymer having an Mn of at least 30,000 and about 8 to about 30 mole % unsaturation.

8. The process of claim 1, wherein said isoolefin is isobutylene and at least one said conjugated diene is a mixture of isoprene, cyclopentadiene or methylcyclopentadiene, said resultant terpolymer having an Mn of at least 30,000 and a mole % unsaturation of at least about 8 to about 45.

9. The process of claim 1, wherein said isoolefin is isobutylene and said conjugated diene is selected from the group consisting of cyclopentadiene and methylcyclopentadiene, said resultant copolymer having an Mn of at least 30,000 and a mole % unsaturation of at least about 8 to about 45.

10. The product prepared by the process which comprises connecting a plurality of stirred reactor zones in series;
   (a) adding to said first reactor zone:
      1. A first feed of isobutylene and a conjugated cyclodiene being selected from the group consisting of cyclopentadiene and methylcyclopentadiene, said isobutylene and said cyclodiene being dissolved in a cosolvent, said cosolvent being selected from the group consisting of cyclic, branched or normal paraffinics, hydrocarbons and mixtures thereof, and
      2. A second feed of a catalyst dissolved in a hydrocarbon solvent having about 1 to about 10 carbon atoms, said catalyst being the reaction product of an aluminum containing compound ($R_mAlX_{3-m}$) and a halogen containing compound, wherein R is an alkyl radical having about 1 to about 7 carbon atoms and X is selected from the group consisting of chlorine, bromine and mixtures thereof, or iodine, and m is 1, 2 or 3, said halogen containing compound being selected from the group consisting of halogen acids, halogens, interhalogens and organohalides;
   (b) polymerizing a portion of said isobutylene and at least one said conjugated cyclodiene at a temperature in the range of about $-60°$ to about $-110°$ C., at a pressure of from about 0 to about 500 psig, to form a polymer cement;
   (c) passing said polymer cement from said first reaction zone to second reaction zone, connected in series with said first reaction zone;
   (d) adding to said second reaction zone:
      1. a third feed of additional said isobutylene and said conjugated cyclodiene dissolved in said cosolvent, and
      2. a fourth feed of additional said catalyst dissolved in said solvent;
   (e) further polymerizing said isobutylene and at least one said conjugated cyclodiene at a temperature in the range of about $-40°$ to about $-90°$ C., at a pressure of from about 0 to about 500 psig;
   (f) discharging the contents from said second reaction zone and terminating the polymerization reaction of said discharged contents; and
   (g) collecting the elastomeric co- or terpolymer, said co- or terpolymer having at least 8 mole % cyclodiene unsaturation and Mn of at least 30,000.

11. The product according to claim 10, further including isoprene.

* * * * *